(12) United States Patent
Hunt

(10) Patent No.: US 6,239,425 B1
(45) Date of Patent: May 29, 2001

(54) COLOR SCANNING SYSTEM FOR REDUCING OR ELIMINATING THE EFFECTS OF IMPERFECTIONS IN OR ON THE IMAGE

(75) Inventor: Stuart William Arundell Hunt, Hertford (GB)

(73) Assignee: Innovation TK, Ltd., Hertfordshire (GB)

( * ) Notice: Subject to any disclaimer, the term of this patent is extended or adjusted under 35 U.S.C. 154(b) by 0 days.

(21) Appl. No.: 09/387,711

(22) Filed: Aug. 24, 1999

(30) Foreign Application Priority Data

Aug. 24, 1998 (GB) .................................................. 9818443

(51) Int. Cl.7 ........................................................ G01J 3/34
(52) U.S. Cl. .................... 250/226; 348/104; 250/559.02; 358/505
(58) Field of Search .............................. 250/559.02, 226, 250/208.1; 348/104, 262–265, 272, 273; 352/42; 355/32; 356/416, 419, 443, 444; 358/505, 506, 512, 515

(56) References Cited

U.S. PATENT DOCUMENTS

| 2,947,810 | * | 8/1960 | Horsley | 348/106 |
| 4,481,414 | * | 11/1984 | Gasper | 250/226 |
| 4,570,179 | * | 2/1986 | Lees | 250/237 R |
| 4,586,076 | * | 4/1986 | Watt | 250/207 |
| 4,709,260 | * | 11/1987 | Geerts et al. | 348/263 |

FOREIGN PATENT DOCUMENTS 8302866   8/1983  (WO) .

* cited by examiner

Primary Examiner—Stephone B. Allen
(74) Attorney, Agent, or Firm—McDonnell Boehnen Hulbert & Berghoff

(57) ABSTRACT

A color scanning system is provided for scanning an image, the scanner comprising means for scanning the image with light; means for splitting light transmitted from the image, including both directly transmitted light and light scattered as a result of imperfections in or on the image, into a plurality of spectral components; means for directing the spectral components to respective photoresponsive devices; and means for filtering the split components of the light before reception by the photoresponsive devices; wherein a first band pass filtering system is provided to filter the directly transmitted light and a second band pass filtering system is provided to filter the scattered light, the characteristics of the first and second band pass filtering systems being different and such that the intensities of the direct and scattered light received by each photoresponsive device will be balanced so as to reduce or eliminate the effects of imperfections in or on the image.

23 Claims, 3 Drawing Sheets

COLOR SCANNING SYSTEM FOR REDUCING OR ELIMINATING THE EFFECTS OF IMPERFECTIONS IN OR ON THE IMAGE

BACKGROUND OF THE INVENTION

The present invention relates to the optical scanning of images and in particular photographic images such as still transparencies or cinematographic film to produce electrical signals corresponding to the images, for example for television pictures or video recordings.

Machines to produce such electrical signals from motion picture film, generally referred to as "telecine machines" have been known for many years. References indicate that such a process was known in the 1920's and used by John Logie Baird. Examples of current telecine machines include the "URSA Diamond" (TM) manufactured by Cintel International Ltd. of Ware, Hertfordshire, and the "SPIRIT Datacine" (TM) from Philips of Darmstadt, Germany.

A problem that exists in the use of such machines concerns the visibility in the final television or video image of damage on the original film. Cinematographic film is very fragile, and the emulsion layer which carries the image can be easily damaged in use by particles of dust, handling, friction, abrasion, and in other ways. Damaged areas of the film are immediately noticeable to the eye as light incident on the damaged region is scattered by the uneven surface of the film at that point and the consequent difference in the effective thickness of the film. The granularity of the film may also cause scattering.

Many methods are used to minimise the effect of damage on the video images obtained from film. One widely known technique involves the use of a so-called "wet gate". Such systems are made by Peterson of Wheeling, Ill., USA. According to this technique the film is not scanned in air, as would be the normal case, but in a glass tank filled with a liquid of the same optical refractive index as the film emulsion. Thus, the optical effect of the liquid is to fill the scratch, thereby preventing scattering of the light at damage sites, as the film and liquid form an optically continuous medium of constant refractive index.

These wet gate methods are fraught with difficulty. One problem is that the most widely used liquid of the correct refractive index is perchlorethylene, a known carcinogen. The containment of the liquid in the tank is a second issue that causes difficulty. It is usual for the film to pass through rubber squeegees. These rubber blades act as wipers that rub the fluid off the film. However, the blades inevitably cause damage to the film, such that a slightly damaged film which is passed through the wet gate will generally only be suitable for further use on other wet gate systems as its condition will be worsened by the wet gate process. A further feature that makes the wet gate process undesirable is that the liquids used in wet gates often act as solvents. Thus, the materials that are used inside the tank must be tested to ensure that they will not be damaged by the fluids used. Additionally, the fluids used in wet gates are often flammable, thus making their use highly undesirable.

Other techniques used to minimise the visibility of film damage include methods that illuminate the film with diffuse light. Such known methods include the use of so-called 'integrating cylinders'. For example, U.S. Pat. No. 4,868,383 assigned to the Eastman Kodak Company discloses a linear light source for a film scanner including means for generating an intense beam of light and an elongated cylindrical integrated cavity having diffusely reflective walls, and defining an input port through which the intense beam is introduced into the cavity and an output slit parallel to the long axis of the cylindrical integrating cavity to emit a uniform line of light. U.S. Pat. No. 5,241,459, also assigned to the Eastman Kodak Company, discloses an integrating cylinder for use as an illuminator for a film scanner. These methods suffer from difficulties involved in the manufacture of these integrating cylinders, which are very costly to produce, and inevitably have some variation in the evenness of light emitted across the slit.

U.S. Pat. No. 4,937,614, assigned to the Fuji Film Co. Ltd teaches the use of an anisotropic diffusing lens disposed between the transparent original and the light source for diffusing light only in one direction, running along the length of the film, to cope with scratches. Yet again, the manufacture of such anisotropic diffusing elements poses many problems.

It has been realised that in conventional scanning systems with point light illumination, because scattered light is not collected, the scratched and damaged areas are visible in the final image, as less light is collected from these regions. Thus, in a solution to the problem, rather than scanning the film with diffuse light and collecting it at a point detector, the film may be illuminated with light from a point source and the scattered light from the damaged film may be collected. In this way, it has been proposed that the visibility of damage to the film to be scanned, in particular to the emulsion thereof, in the resultant electrical image may be reduced.

PCT patent application WO 83/02869 of Kodak Limited discloses a system for maximising the amount of scattered light which is passed to a detector in the form of a photomultiplier tube. Thus, surrounding a gate in which the film is scanned are mirrors forming a truncated pyramid to capture all of the scattered light and to direct it, together with the directly transmitted light, to a beam splitter. From the beam splitter to each photomultiplier tube there are also provided mirrors in the form of a truncated pyramid. The purpose of the arrangement is to collect as much scattered light as possible, so that the amplitude of the scattered light can nearly equate in value to the average value of the directly transmitted light. However, the scattered light received by a particular photomultiplier tube will not be of the correct colour as it will include scattered light with the wrong colour components. The specification says that this is acceptable since the human eye is much more sensitive to changes in density than to changes in colour in the fine detail of a reproduction. There is thus a possibility that imperfections will show up in a different colour and that the whole colour balance of the image may be affected.

PCT patent application WO 83/02866 of Kodak Limited also discloses a system for maximising the amount of scattered light which is passed to a detector in the form of a photomultiplier tube. This uses a similar system of mirrors to collect scattered light. To increase further the ratio of scattered light detected to direct light detected, this arrangement provides an attenuating filter for the direct light. This suffers from the same problem that imperfections may show up in a different colour and that the colour balance of the image may be affected. The deliberate reduction in the amount of direct light which has passed through the film, using a neutral density attenuating filter, will also reduce the signal to noise ratio.

U.S. Pat. No. 4,481,414, assigned to Eastman Kodak Company, also aims to collect scattered light but uses tapered optical bars, in which there is total internal reflection, rather than mirrors. This system uses trimming filters for the photocells.

SUMMARY OF THE INVENTION

One aspect of the present disclosure is based on the realisation that a considerable improvement can be made in suppressing imperfections, such as scratches, by filtering both the scattered light and the direct light using band pass filters. It is important to filter the scattered light for purity as well as the direct light. In practice a significant proportion of light is scattered, even with "perfect" film and if this is combined back with the unscattered light then it dilutes the purity of the light and causes overall colour response problems. However, it is also important to balance the intensities of the direct and scattered light.

According to one aspect of an invention disclosed herein there is provided a process for colour scanning an image, comprising the steps of scanning the image with light; splitting the light transmitted by the image, including both directly transmitted light and scattered light, into a plurality of spectral components; directing the spectral components to respective photoresponsive devices; and filtering the split components of the light before reception by the photoresponsive devices; wherein a first band pass filtering system is used to filter the directly transmitted light and a second band pass filtering system is used to filter the scattered light, the characteristics of the first and second band pass filtering systems being such that the intensities of the direct and scattered light received by each photoresponsive device are balanced so as to reduce or eliminate the effects of imperfections in or on the image.

According to another aspect of an invention disclosed herein there is provided a colour scanning system for scanning an image, comprising means for scanning the image with light; means for splitting light transmitted from the image, including both directly transmitted light and light scattered as a result of imperfections in or on the image, into a plurality of spectral components; means for directing the spectral components to respective photoresponsive devices; and means for filtering the split components of the light before reception by the photoresponsive devices; wherein a first band pass filtering system is provided to filter the directly transmitted light and a second band pass filtering system is provided to filter the scattered light, the characteristics of the first and second band pass filtering systems being different and such that the intensities of the direct and scattered light received by each photoresponsive device will be balanced so as to reduce or eliminate the effects of imperfections in or on the image.

Thus, in a preferred arrangement, light being transmitted through a target image such as a film may encounter an imperfection. Some of the light may be transmitted directly but some of the light will be scattered. Whilst in previous proposals as much as possible of this light has been collected by using e.g. conical mirrors, in the present arrangement this is not necessary and indeed may be undesirable. Whilst a significant quantity of the scattered light is collected, some may escape the system completely. The scattered light that is captured will suffer from colour impurity, and so it is subjected to band pass filtering. The net result is that the overall intensity of the scattered light received by the photoresponsive device will be reduced by a significant proportion compared to the amount originally scattered. The direct light will all be captured by the system, and will also suffer less colour impurity. Putting this light through the same band pass filter would result in a smaller reduction in intensity than for the scattered light, because there is less light outside the desired band. The result is that the overall intensity of the direct light would be greater than that of the scattered light, and imperfections such as scratches would be evident. In accordance with the invention, to balance the intensities, rather than reduce the overall level of the direct light by means of an attenuating filter as suggested by the prior art, the band pass filters are set to have different characteristics. For example, by reducing the bandwidth of the direct light there will be an overall reduction in intensity, whilst there need be no reduction of the amount of light at a desired peak. The aim would be to reduce the intensity of the direct light by eliminating light at the fringes rather than across the band including light in a central, desired zone.

By using band pass filters, it is possible to ensure that there is no significant attenuation of the desired light reaching the photoresponsive device. In prior art systems such as those disclosed in WO 83/02866 and WO 83/02869, as much as possible of the scattered light is directed to the photoresponsive device, and the direct light is passed through an attenuating filter which will be of neutral density. By contrast, in the present invention the emphasis is not on adjusting the overall light levels of scattered and direct light received at the photoresponsive device, which will result in the rejection of some useful light, but on adjusting the respective band pass filtering parameters so that the correct quantities of wanted light are received.

The expression "band pass" used herein is intended to cover narrow band pass filters as well as high wavelength pass and low wavelength pass filters. For example, when filtering green light it would be necessary to use a narrow band pass filter, whereas blue light would require a low wavelength pass filter and red light a high wavelength pass filter. In typical telecine installations, infra red light is already filtered out.

In a typical example, a high wavelength pass filter for the red component of the scattered light would have a 50% transmission value at 610 nm, whilst that for the direct light would be higher at 616 nm. For the blue scattered light a low wavelength pass filter might have a 50% transmission value at 490 nm whereas for the direct light it would be 480 nm. For green, there could be narrow band pass filters, each with a central peak at 545 nm, but with the scattered light having the 50% transmission points at, say 518 and 572 nm, and the direct light at 525 and 565 nm. Generally speaking, for green narrow band pass filters there may be a reduction in bandwidth (i.e. between the 50% transmission points) of between 5 and 20 nm, and preferably between 10 and 15 nm, for the direct light as compared to the scattered light. For the red high wavelength pass filters and blue low wavelength pass filters the shift in the 50% transmission points may also be between 5 and 20 nm, and preferably between 5 and 10 nm.

The use of two different band pass filtering systems may be of somewhat more general applicability.

According to an invention disclosed herein, there is provided a colour scanning system for scanning an image, comprising means for scanning the image with light, beam splitting means for receiving light transmitted by the image and for directing respective spectral components thereof towards respective photoresponsive devices, and respective filtering means disposed in the light path between the beam splitting means and each photoresponsive device; wherein the arrangement is such that the beam of light passed to each photoresponsive device will comprise an inner region whose principal content is light which has been transmitted normally by the image and, if there are imperfections in or on the image, an outer region whose principal content is light which has been scattered as a result of such imperfections; wherein each filtering means comprises a first band pass filtering system for modifying light in the inner region which reaches the photoresponsive device according to first band pass filtering parameters, and a second band pass filtering system for modifying light in the outer region which reaches the photoresponsive device according to second band pass filtering parameters.

By choosing the first and second filtering parameters it is possible to control carefully the nature of the light received by the respective photoresponsive devices. In the preferred arrangement, such as discussed earlier, the first and second band pass filtering systems provide different characteristics, and direct light which has been transmitted normally by the image will be filtered in one way, and scattered light in another way. For example, whilst both types of light will be passed through band pass filtering systems, one may have a broader bandwidth than the other and/or one may have a transmission peak at a different frequency to the other. There might nevertheless be circumstances where it would be possible for the band pass parameters to be the same, provided of course that two filtering systems are employed. For example, the direct light could be filtered at one location in the optical path, and the scattered light at another location.

The most significant embodiment of the inventions disclosed herein is when the band pass filtering system is used to balance the intensities of the scattered light and the direct light.

By using a system as above described it is unnecessary to use systems of mirrors or optical bars to collect as much scattered light as possible. Using a suitably large lens after the beam splitter will gather as much of the scattered light as is desired. To gather all scattered light is undesirable because extreme scattered light may contain false image information. Surface damage may cause light to be scattered at extreme angles so that it exits the film very obliquely. Such light may have a spurious transmission value because it has passed diagonally through the emulsion of the film. For this reason in practical arrangements the size of the lens after the beam splitter is not so great as to capture all possible scattered light. For example, it may be dimensioned to as to capture only scattered light which has been scattered at the film by no more than 45 or preferably 30 degrees from the optical axis. Nevertheless, there may be situations in which it would be considered desirable to use the present invention in conjunction with systems for enhancing the amount of scattered light collected, such as those using mirrors and so forth discussed above. The band pass filter will ensure that only the required light reaches the photoresponsive device.

There are a number of ways in which two different band pass filtering systems could be provided. For example, there could be provided a filter with different characteristics in inner and outer regions. This could be as simple as a central region of one filter material and an outer region of another filter material, or there could be variable characteristics. There could be a large filter onto which is superimposed a central filter. There could be a central filter at one location to filter direct light, and an annular filter at another to filter scattered light. There could be an overall filter at one location, and either a central filter or an annular filter at another, so that one of the types of light will be filtered twice.

In the preferred embodiment the direct light in the inner region passes through two filters and the scattered light in the outer region passes through only one. In the preferred embodiment, the photoresponsive device is provided with a band pass filter for light in both regions, and between there and the beam splitting means there is a central filter for the direct light in the inner region. It would be possible for the light to pass first through a filter for both regions, e.g. in the region of a lens after the beam splitting means, and then through a central filter for the direct light only in the area of the photoresponsive device. However, as the beam of light, including both direct and scattered light, is broad in the region of the lens after the beam splitting means and converges to the photoresponsive device it would be necessary for the first filter to be of a considerable size.

In some instances, regardless of how many levels of filtering there are, it may be preferred that the direct light be subject to more levels of filtering than the scattered light. Although the spectral characteristics of the filtered light received by the photoresponsive device should be different for the direct light and the scattered light, and may be obtained by using different filter materials, where the number of levels is different it is possible to obtain different characteristics using the same filter material. For certain types of absorption filter the transmission characteristics can vary in accordance with the characteristics of the received light. For example, a red pass filter material with a 50% transmission value nominally at 610 nm may have a 50% transmission value at 616 nm if the light has already passed through the material once.

Although, as mentioned above, the different filtering of the direct and the scattered light may be achieved in a number of ways, there is a preferred optical arrangement. In a typical arrangement there will be beam splitting means such as two dichroic mirrors to separate out the red, green and blue spectral components. Each respective component passes to a respective imaging lens which focuses the light towards the corresponding photoresponsive device. The imaging lens is of a sufficient diameter to receive both direct and scattered light, and is preferably a Fresnel lens.

In the preferred arrangement a first filter, for the direct light, is positioned in the region of the imaging lens, over a central region of the lens. In the preferred system, the optical arrangement includes an objective lens assembly with an aperture control stop, a condenser lens after the image plane—preferably acting substantially as a telecentric lens, beam splitting means, and for each colour component an imaging lens after the beam splitting means. The imaging lens is preferably positioned in the region of the image of the aperture control stop, and for example shortly after it. The region of the image of the aperture control stop is a preferred location for the first filter, for the direct light. At this point there is zero film image and thus defects on the filter, or dust on the surface of the filter or Fresnel lens will have no imaging effect.

Preferably, the filter for the scattered light is provided in the region of the photoresponsive device for each component. In the preferred arrangement, a filter is provided in this region which serves both as a filter for the scattered light and as a second filter for the direct light.

The filtering of direct light in the region of the imaging lens may be of use with other arrangements. Accordingly, a further invention disclosed herein provides a colour scanning system for scanning an image, comprising means for scanning the image with light, beam splitting means for receiving light transmitted by the image and for directing respective spectral components thereof towards respective photoresponsive devices; wherein the arrangement is such that the beam of light passed to each photoresponsive device will comprise an inner region whose principal content is light which has been transmitted directly by the image and, if there are imperfections in or on the image, an outer region whose principal content is light which has been scattered as a result of such imperfections; a respective imaging lens between the beam splitting means and each photoresponsive device, for light in both the inner and outer regions; and a respective filter between the beam splitting means and each photoresponsive device; wherein the filter is positioned in the region of the respective imaging lens and is positioned and dimensioned so as substantially to filter light in the inner region.

The filter may be a band pass filter or could be an attenuating filter. Whilst this would not provide the advantages of the preferred arrangements disclosed herein, it would be an advantage over a system using mirrors and a central filter at the photoresponsive device as in WO 83/02866. Of course a filter may be also positioned elsewhere, such as in the region of the photoresponsive device. This may be for the scattered light only or for both the direct light and the scattered light, as in the arrangements discussed earlier in which both filters are band pass filters. The filter in the region of the imaging lens may be used only to filter direct light, but it could also be used to filter scattered light, and if desired according to different characteristics. For example, the filter could comprise a large diameter layer on which is placed a smaller diameter central layer for the direct light only.

According to a further aspect of an invention disclosed herein, there is provided a process for colour scanning an image, comprising the steps of scanning the image with light, splitting light transmitted by the image and directing respective spectral components thereof towards respective photoresponsive devices, and filtering the light between the beam splitting means and each photoresponsive device; wherein the beam of light passed to each photoresponsive device comprises an inner region whose principal content is light which has been transmitted normally by the image and, if there are imperfections in or on the image, an outer region whose principal content is light which has been scattered as a result of such imperfections; wherein the step of filtering the light comprises the use of a first band pass filtering system for modifying light in the inner region which reaches the photoresponsive device according to first band pass filtering parameters, and the use of a second band pass filtering system for modifying light in the outer region which reaches the photoresponsive device according to second band pass filtering parameters.

According to a further invention disclosed herein, there is provided a process for colour scanning an image, comprising the steps of scanning the image with light, splitting the light transmitted by the image and directing respective spectral components thereof towards respective photoresponsive devices; wherein the beam of light passed to each photoresponsive device comprises an inner region whose principal content is light which has been transmitted directly by the image and, if there are imperfections in or on the image, an outer region whose principal content is light which has been scattered as a result of such imperfections; providing a respective imaging lens between the beam splitting means and each photoresponsive device, for light in both the inner and outer regions; and providing a respective filter between the beam splitting means and each photoresponsive device; wherein the filter is positioned in the region of the respective imaging lens and substantially filters light in the inner region only.

It will be appreciated that it may not be possible to define a positive distinction between an inner region of direct light and an outer region of scattered light. In practice there may be a region where there is a mixture of direct and scattered light. For the purposes of the present inventions, the inner region comprises principally direct light, and the outer region principally scattered light, but it is not absolutely essential that either region contains exclusively one or the other.

The preferred arrangements of the inventions disclosed herein use band pass filters which are separate from the beam splitting means. Common dichroic mirrors used in beam splitting arrangements do not separate the light into narrow enough colour bands to analyse colour with good fidelity. However, it may be that there would be dichroic mirrors or other beam splitting means which would act as sufficiently narrow band pass filters. In such circumstances, only a single separate band pass filter would be required, and in the preferred arrangement for removing the effects of imperfections this would cover a central region only so as to filter the direct light again, and not the scattered light. In this way it could be arranged that the direct and scattered light are filtered according to different characteristics so as to balance the intensities received at the photoresponsive devices.

The invention is of particular use for telecine machines, although it can also be used for still colour transparencies, and other arrangements in which light is transmitted through a target image. Aspects of the invention may also be applicable to arrangements in which light is transmitted from an image by reflection rather than passing through the image.

The invention may also incorporate means for compensating for the back scattering of light. For example, this could involve the use of front positioned photodetectors which are arranged to collect light that is scattered from the front of the film. If there is damage to the front surface of the film, a proportion (X) of the total light will be collected by the front photodetectors. For perfect film this would tend towards zero. The signal is used to scale the signals measured by the main photodetectors for the spectral components. If the signal at a main photodetectors is a proportion (Y) of the total light, to account for possible damage on the front surface of the film the signal would have to be scaled to $Y/(1-kX)$ where k is a scaling factor.

BRIEF DESCRIPTION OF THE DRAWINGS

An embodiment of the inventions will now be described by way of example and with reference to the accompanying drawings, in which.

DETAILED DESCRIPTION OF THE INVENTION

Figure 1:
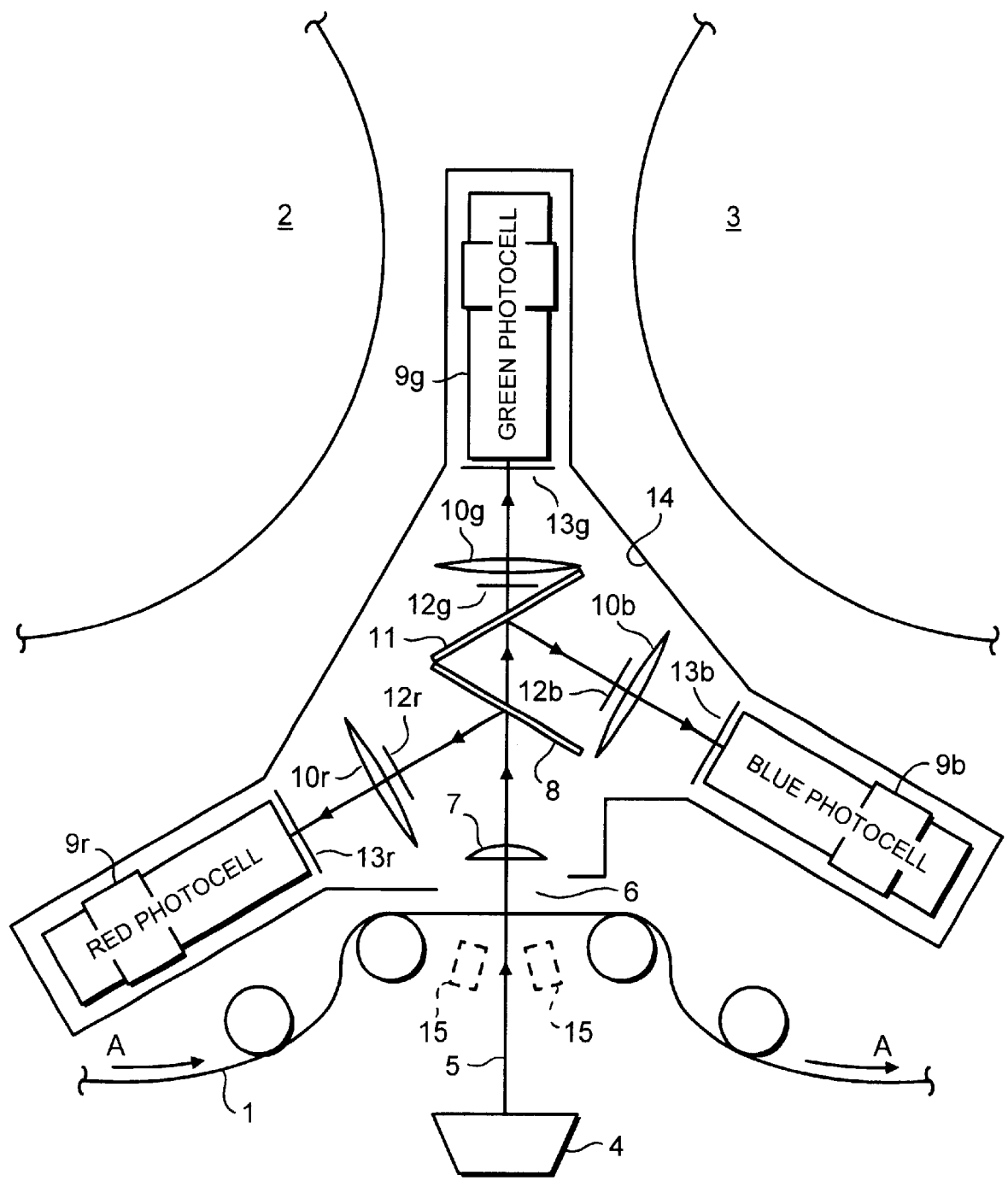
FIG. 1 is a schematic view of an embodiment of the invention installed on a telecine machine.

FIG. 1 shows in schematic form apparatus according to an embodiment of the inventions mounted on the deck plate of a telecine machine such as an "URSA Diamond" (TM) manufactured by Cintel International Ltd. A colour cinematographic film 1 is moved in the direction of the arrows A shown from reel 2 to reel 3. A source 4 of a point of light such as a cathode ray tube provides a beam of light 5 which is used to scan a frame 6 of the film at a gate.

Once the light beam 5 has passed through the film frame 6, it passes through a substantially telecentric condenser lens 7 and is then incident on a first dichroic mirror 8, which reflects red light towards a photodetector 9r via a lens 10r, but allows blue and green light to pass undeviated. The blue and green light is then incident on a second dichroic mirror 11 which reflects the blue light towards a photodetector 9b, via a lens 10b, while allowing the green light to pass undeviated to a photodetector 9g, via a lens log. The lenses 10r, 10g and 10b are Fresnel lenses, and are of a sufficient diameter to receive light which has been scattered by imperfections in or on the film such as scratches or dust, and to direct it towards the photocells. However, the diameter is not so large as to catch unwanted scattered light. For the system illustrated, which is for use with an URSA (TM) telecine machine the diameter of the Fresnel lenses may be about 120 mm.

Just before each Fresnel lens is a first band pass filter, 12r, 12g and 12b respectively. Each of these, typically circular, extends over only a central region of the associated lens, and is intended to filter direct light. Light which has been scattered passes through the lens outwardly of the filtered region. Just in front of each photodetector 9r, 9g and 9b is provided a second band pass filter 13r, 13g, 13b which extends over the face of the photodetector and will filter both direct and scattered light received at the photodetector. The arrangement is contained within a generally light proof housing 14.

Indicated at 15 are optional photodetectors to detect light scattered back from the front of the film, to compensate for that in the manner described earlier.

The high wavelength pass filters 12r, 13r for the red component of the light are of Schott RG 610 glass, manufactured by Schott Glasswerke of Mainz, Germany. This glass has a normal 50% transmission value at 610 nm for one particular thickness used as the filters 12r, 13r and that is the filtering characteristic for the scattered light which passes through only filter 13r. The direct light passes through both filters and there is a shift in the 50% transmission point to 616 nm. This means that the total intensity of the red direct light is reduced and it substantially balances with the intensity of the scattered light. For the blue light low wavelength pass filters 12b, 13b there is used a dichroic material which has a normal 50% transmission value at 490 nm and that is the filtering characteristic for the scattered light. For the twice filtered direct light it would be 480 nm. For green, there is used a narrow band pass filter material for the filters 12g, 13g, with a normal central peak at 545 nm and the 50% transmission points at 518 and 572 nm. For the twice filtered direct light these shift to 525 and 565 nm. The net result is that the intensities of the captured scattered light and the direct light are balanced for the three colour components, and the effects of imperfections are cancelled out. As described earlier this is achieved by selectively filtering the direct light rather than by using a broad spectrum attenuating filter as in the prior art.

Figure 2:
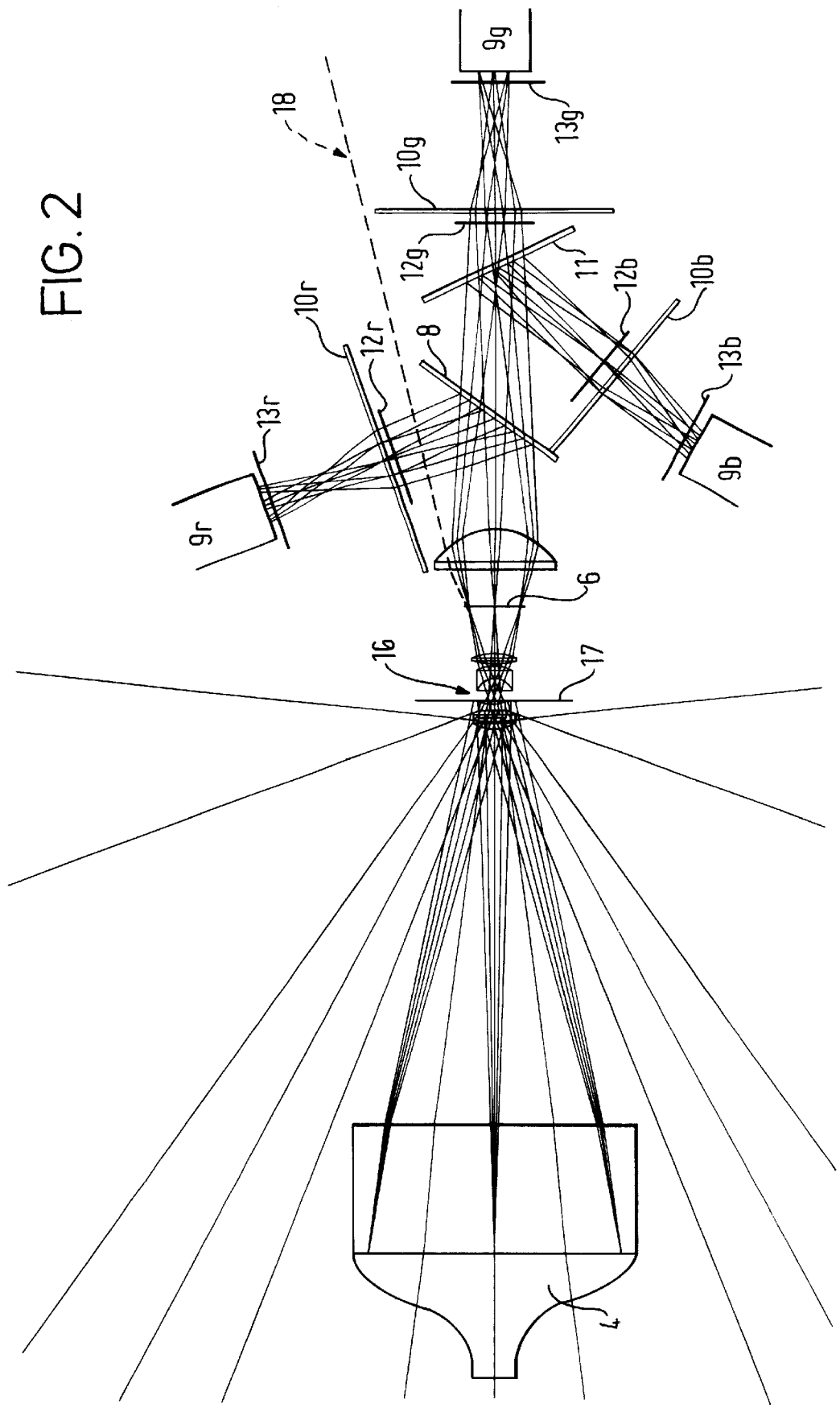
FIG. 2 is a schematic ray diagram illustrating the optical arrangement.

FIG. 2 is a schematic ray diagram showing the optical arrangement in more detail. This shows the cathode ray tube 4 with the scanning spot shown in three different positions. Also shown is an objective lens assembly 16, with an aperture control stop 17. The objective lens assembly images the spot onto film frame 6 at the image plane. The light then passes to the beam splitting dichroic mirrors and through the filters and Fresnel lenses to the photodetectors 9r, 9b, 9g. It can be seen that both direct light and scattered light is directed to the photodetectors. However, extreme scattered light as indicated by the line 18 is not collected by the system. The Fresnel lenses 10r, 10g, 10b and the direct light filters 12r, 12g, 12b are positioned close to the images of the lens stop where there will be zero film image, and the photodetectors 9r, 9g, 9b and filters 13r, 13g, 13b are positioned close to the film images.

In an alternative embodiment of the invention, a telecine machine is provided including an apparatus according to the invention as an integral part thereof. This allows the optical arrangement of the apparatus to be simplified as compared to the apparatus to be mounted to the deck plate of a telecine described above.

Figure 3:
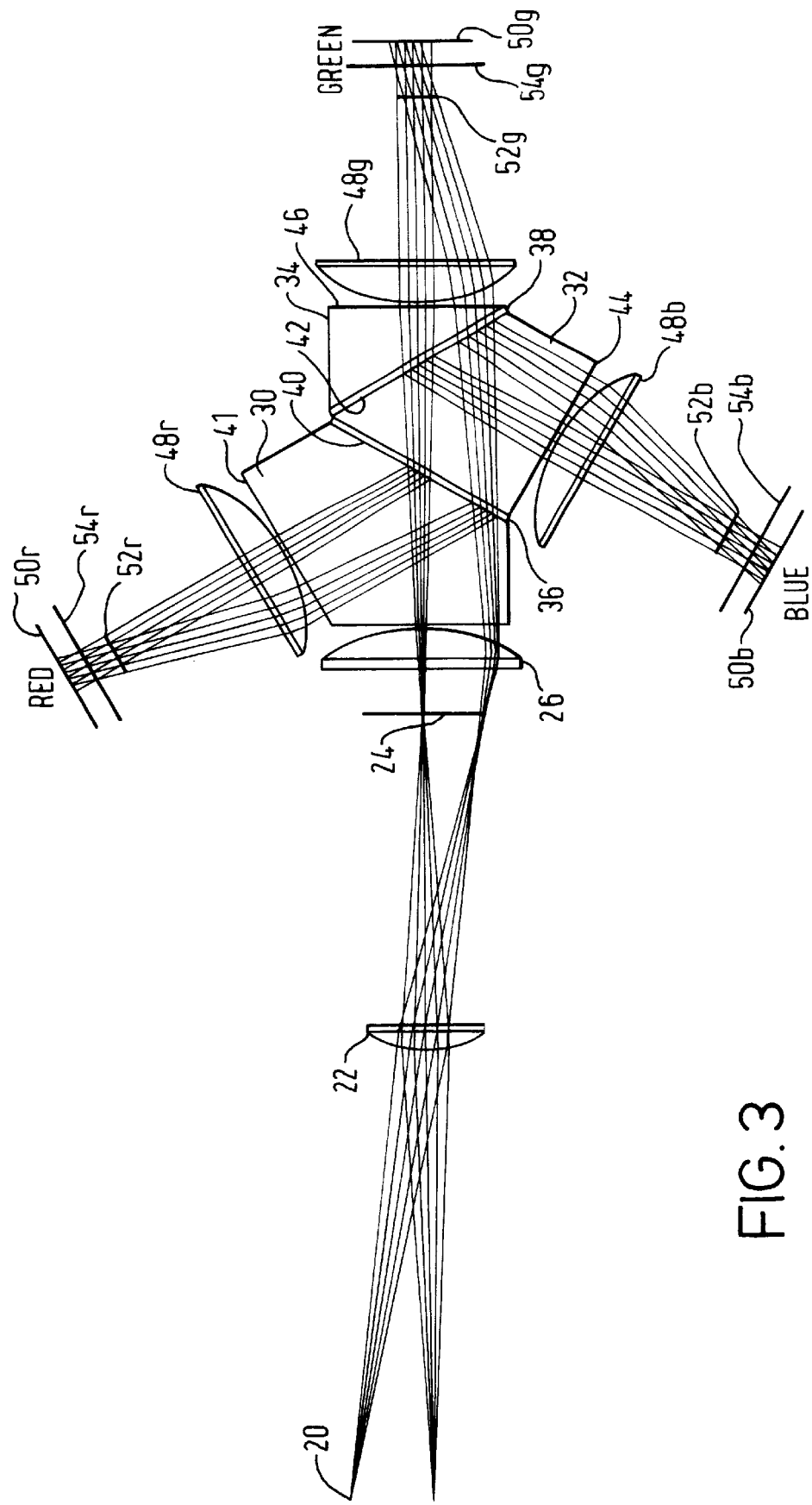
FIG. 3 is a schematic ray diagram illustrating the optical arrangement in an alternative embodiment of the invention.

FIG. 3 shows the optical arrangement of the apparatus according to this alternative embodiment in schematic form. As in the first embodiment shown in FIGS. 1 and 2, a cathode ray tube 20 provides a beam of light. In FIG. 3, the scanning spot of the cathode ray tube is shown in two different positions. The spot passes through a multi element lens 22 and is imaged onto film frame 24 at the image plane.

The light then passes through a collimating lens 26 such as a Fresnel lens before entering a system 28 of prisms and dichroic filters. This system 28 comprises a five sided prism 30 arranged adjacent to a four sided prism 32 which in turn is arranged adjacent to a three sided prism 34. A first dichroic filter 36 is arranged in between the five sided prism 30 and the four sided prism 32. A second dichroic filter 38 is arranged between the four sided prism 32 and the three sided prism 34.

Thus on entering the system 28, the light will pass through the five sided prism 30 and reach the surface 40 of the five sided prism 30 at which the first dichroic filter 36 is provided. Due to the properties of the first dichroic filter 38, the blue and green components of the light will not be reflected at the surface 40 but will continue undeviated into the four sided prism 30. The reflected red component of the light then exits the five sided prism 30 at a second surface 41 thereof.

The blue and green components of the light pass across the four sided prism 32 until reaching the surface 42 of that prism at which the second dichroic filter 38 is provided. Due to the properties of the second dichroic filter, the green component of the light is allowed to pass undeviated through the four sided prism and into the three sided prism 34. The blue component of the light however is reflected at the surface 42 of the four sided prism 32 and then exits the four sided prism via a second surface 44 thereof.

The green component of the light passes through the three sided prism 34 and exits via a second surface 46 thereof.

An optical lens 48r,48b,48g is provided at each of the exit surfaces 41,42,46 of the prisms 30,32,34. These lenses are of sufficient diameter to capture at least some scattered light as well as the direct light. The lenses direct the light towards photodetection cells 50r,50b,50g provided for each of the three colour components of the light respectively.

In between each optical lens and each photodetection cell, two trim filters 52r,52b,52g and 54r,54b,54g are provided. These filters are high wavelength pass filters for the red component of the light, low wavelength pass filters for the blue component and narrow band pass filters for the green component. The first high wavelength pass filter 52r is dimensioned such that only the direct part of the red component of the light will pass through it, the second high wavelength pass filter 54r being larger such that both the direct and scattered parts of the red component of the light will pass through it. In this particular embodiment, both high wavelength pass filters have the same filtering characteristics. Thus, effectively, the direct light will be filtered twice whereas the scattered light will only be filtered once. After passing through the filters, the light then reaches the photodetector cell 50r, for the red component of the light.

The filtering characteristics of the first and second low wavelength pass and narrow band pass filters respectively are also chosen to be the same and these filters are again dimensioned so that the scattered scattered parts of the blue and green light components will pass through only one filter 54$b$,54$g$ whereas the direct part will pass through both the first and second filters 52$b$,52$g$,54$b$,54$g$ before reaching the photodetection cells 50$b$,50$g$.

The above system with Fresnel lenses, central band pass filters for the direct light and second band pass filters for both direct and scattered light, provides a simple way of eliminating or substantially reducing the effects of scratches and other imperfections in film being scanned, whilst retaining colour purity.

What is claimed is:

1. A colour scanning system for scanning an image, comprising:
   means for scanning the image with light;
   means for splitting light transmitted from the image, including both directly transmitted light and light scattered as a result of imperfections in or on the image, into a plurality of spectral components;
   means for directing the spectral components to respective photoresponsive devices;
   and means for filtering the split components of the light before reception by the photoresponsive devices;
   wherein a first band pass filtering system is provided to filter the directly transmitted light and a second band pass filtering system is provided to filter the scattered light, the characteristics of the first and second band pass filtering systems being different and such that the intensities of the direct and scattered light received by each photoresponsive device will be balanced so as to reduce or eliminate the effects of imperfections in or on the image.

2. A colour scanning system as claimed in claim 1, wherein the image to be scanned is a photographic image recorded on photographic film.

3. A colour scanning system as claimed in claim 2, wherein the photographic image is part of a cinematographic film.

4. A colour scanning system as claimed in claim 1, wherein a lens is provided so as to capture at least some of the scattered light after it has passed through the means for splitting the light.

5. A colour scanning system as claimed in claim 1, wherein the filtering means are configured such that the direct light passes through two filter s and the scattered light passes through only one filter.

6. A colour scanning system as claimed in claim 1, wherein respective imaging lenses are provided between the light splitting means and the photoresponsive devices so as to focus each respective light component to a corresponding photoresponsive device.

7. A colour scanning system as claimed in claim 6, wherein the imaging lenses are Fresnel lenses.

8. A colour scanning system as claimed in claim 1, wherein the light is split into a plurality of spectral components comprising a red component, a blue component and a green component.

9. A colour scanning system as claimed in claim 8, wherein said first band pass filtering system comprises a high wavelength pass filter for the red component of the direct light, a low wavelength pass filter for the blue component of the direct light, and a narrow band pass filter for the green component of the direct light.

10. A colour scanning system as claimed in claim 8, wherein said second band pass filtering system comprises a high wavelength pass filter for the red component of the scattered light, a low wavelength pass filter for the blue component of the scattered light and a narrow band pass filter for the green component of the scattered light.

11. A process for colour scanning an image, comprising the steps of scanning the image with light;
   splitting the light transmitted by the image, including both directly transmitted light and scattered light, into a plurality of spectral components;
   directing the spectral components to respective photoresponsive devices;
   and filtering the split components of the light before reception by the photoresponsive devices;
   wherein a first band pass filtering system is used to filter the directly transmitted light and a second band pass filtering system is used to filter the scattered light, the characteristics of the first and second band pass filtering systems being such that the intensities of the direct and scattered light received by each photoresponsive device are balanced so as to reduce or eliminate the effects of imperfections in or on the image.

12. A process for colour scanning an image as claimed in claim 11, wherein the image to be scanned is a frame of a cinematographic film, and wherein a plurality of frames are scanned in sequence.

13. A process for colour scanning an image as claimed in claim 11, wherein a lens is provided so as to capture at least some of the scattered light after it has passed through the means for splitting the light.

14. A process for colour scanning an image as claimed in claim 11, wherein the filtering means are configured such that the direct light passes through two filters and the scattered light passes through only one filter.

15. A process for colour scanning an image as claimed in claim 11, wherein respective imaging lenses are provided between the light splitting means and the photoresponsive devices so as to focus each respective light component to a corresponding photoresponsive device.

16. A process for colour scanning an image as claimed in claim 15, wherein the imaging lenses are Fresnel lenses.

17. A process for colour scanning an image as claimed in claim 11, wherein the light is split into a plurality of spectral components comprising a red component, a blue component and a green component.

18. A process for colour scanning an image as claimed in claim 17, wherein said first band pass filtering system comprises a high wavelength pass filter for the red component of the direct light, a low wavelength pass filter for the blue component of the direct light, and a narrow band pass filter for the green component of the direct light.

19. A process for colour scanning an image as claimed in claim 17, wherein said second band pass filtering system comprises a high wavelength pass filter for the red component of the scattered light, a low wavelength pass filter for the blue component of the scattered light and a narrow band pass filter for the green component of the scattered light.

20. A colour scanning system for scanning for an image, comprising means for scanning the image with light, beam splitting means for receiving light transmitted by the image and for directing respective spectral components thereof towards respective photoresponsive devices, and respective filtering means disposed in the light path between the beam splitting means and each photoresponsive device; wherein the arrangement is such that the beam of light passed to each photoresponsive device will comprise an inner region whose principal content is light which has been transmitted normally by the image and, if there are imperfections in or on the image, an outer region whose principal content is light which has been scattered as a result of such imperfections; wherein each filtering means comprises a first band pass filtering system for modifying light in the inner region which reaches the photoresponsive device according to first band pass filtering parameters, and a second band pass filtering system for modifying light in the outer region which reaches the photoresponsive device according to second band pass filtering parameters.

21. A colour scanning system for scanning an image, comprising means for scanning the image with light, beam splitting means for receiving light transmitted by the image and for directing respective spectral components thereof towards respective photoresponsive devices; wherein the arrangement is such that the beam of light passed to each photoresponsive device will comprise an inner region whose principal content is light which has been transmitted directly by the image and, if there are imperfections in or on the image, an outer region whose principal content is light which has been scattered as a result of such imperfections; a respective imaging lens between the beam splitting means and each photoresponsive device, for light in both the inner and outer regions; and a respective filter between the beam splitting means and each photoresponsive device; wherein the filter is positioned in the region of the respective imaging lens and is positioned and dimensioned so as substantially to filter light in the inner region.

22. A process of colour scanning an image, comprising the steps of scanning the image with light, splitting light transmitted by the image and directing respective spectral components thereof towards respective photoresponsive devices, and filtering the light between the beam splitting means and each photoresponsive device; wherein the beam of light passed to each photoresponsive device comprises an inner region whose principal content is light which has been transmitted normally by the image and, if there are imperfections in or on the image, an outer region whose principal content is light which has been scattered as a result of such imperfections; wherein the step of filtering the light comprises the use of a first band pass filtering system for modifying light in the inner region which reaches the photoresponsive device according to first band pass filtering parameters, and the use of a second band pass filtering system for modifying light in the outer region which reaches the photoresponsive device according to second band pass filtering parameters.

23. A process of colour scanning an image, comprising the steps of scanning the image with light, splitting the light transmitted by the image and directing respective spectral components thereof towards respective photoresponsive devices; wherein the beam of light passed to each photoresponsive device comprises an inner region whose principal content is light which has been transmitted directly by the image and, if there are imperfections in or on the image, an outer region whose principal content is light which has been scattered as a result of such imperfections; providing a respective imaging lens between the beam splitting means and each photoresponsive device, for light in both the inner and outer regions; and providing a respective filter between the beam splitting means and each photoresponsive device; wherein the filter is positioned in the region of the respective imaging lens and substantially filters light in the inner region only.

\* \* \* \* \*